(No Model.) 9 Sheets—Sheet 1.
J. KENNEDY & H. AIKEN.
UNIVERSAL ROLLING MILL.
No. 403,273. Patented May 14, 1889.
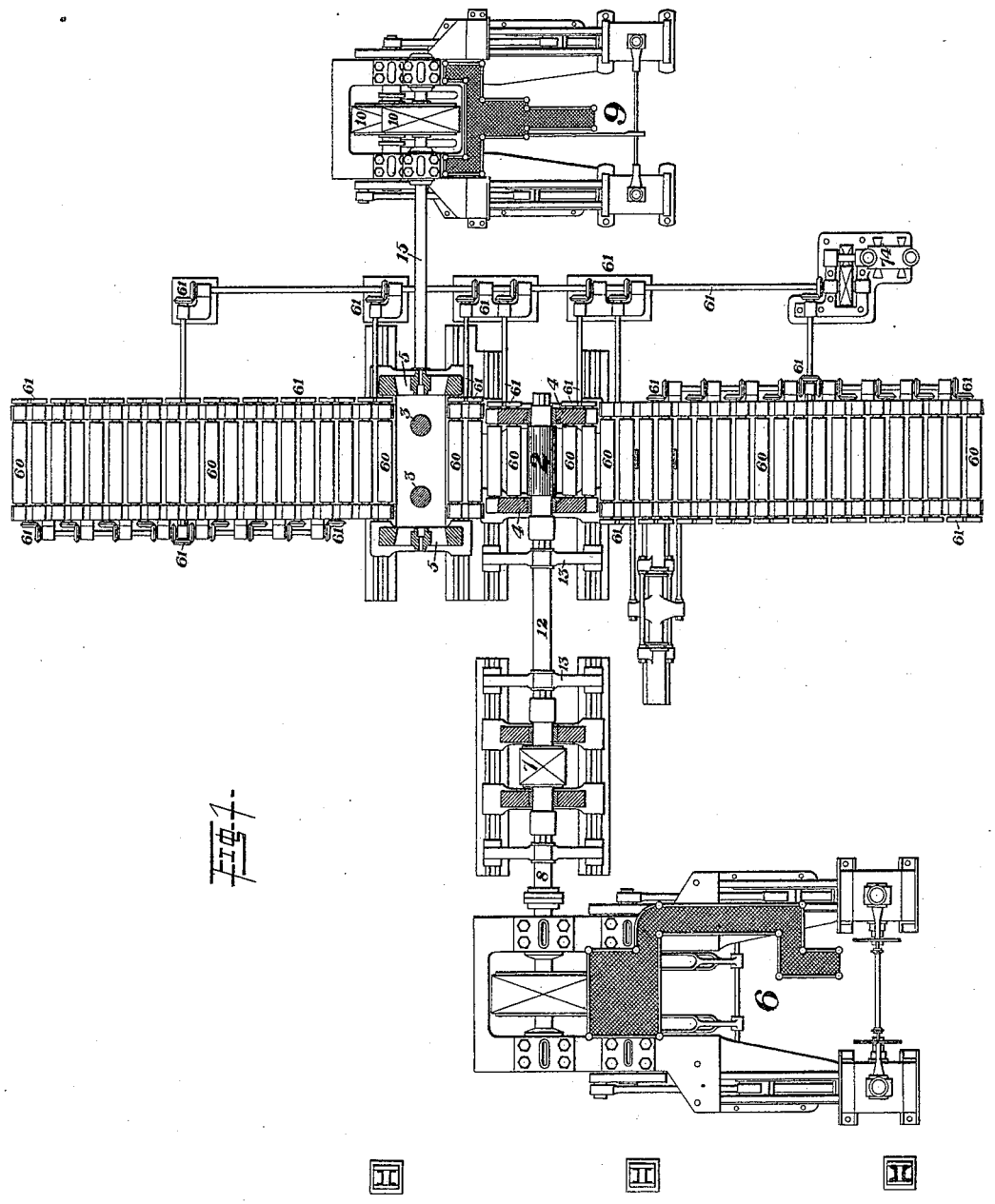

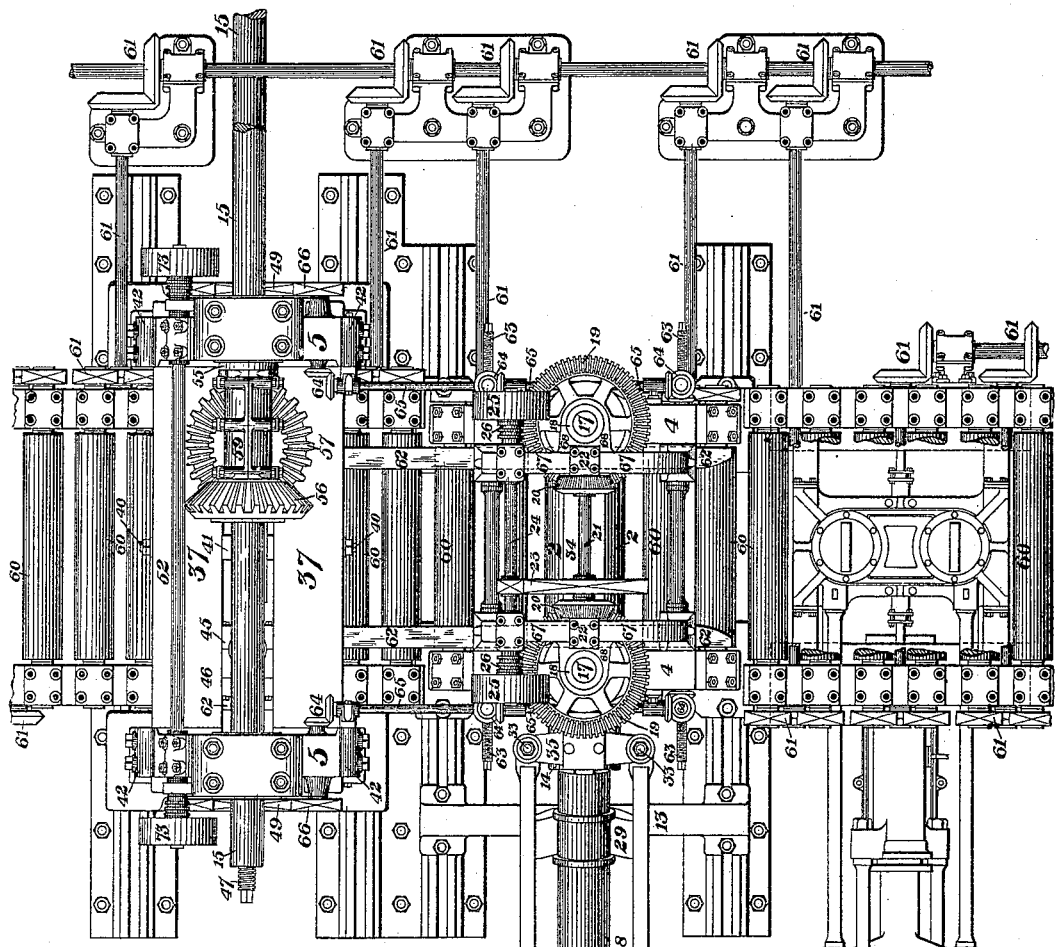

(No Model.) 9 Sheets—Sheet 3.

J. KENNEDY & H. AIKEN.
UNIVERSAL ROLLING MILL.

No. 403,273. Patented May 14, 1889.

WITNESSES.
H. L. Gill.
W. B. Corwin

INVENTORS.
Henry Aiken
Julian Kennedy
by W. Bakewell & Sons
Their Attorneys (No Model.) 9 Sheets—Sheet 4.
J. KENNEDY & H. AIKEN.
UNIVERSAL ROLLING MILL.
No. 403,273. Patented May 14, 1889.
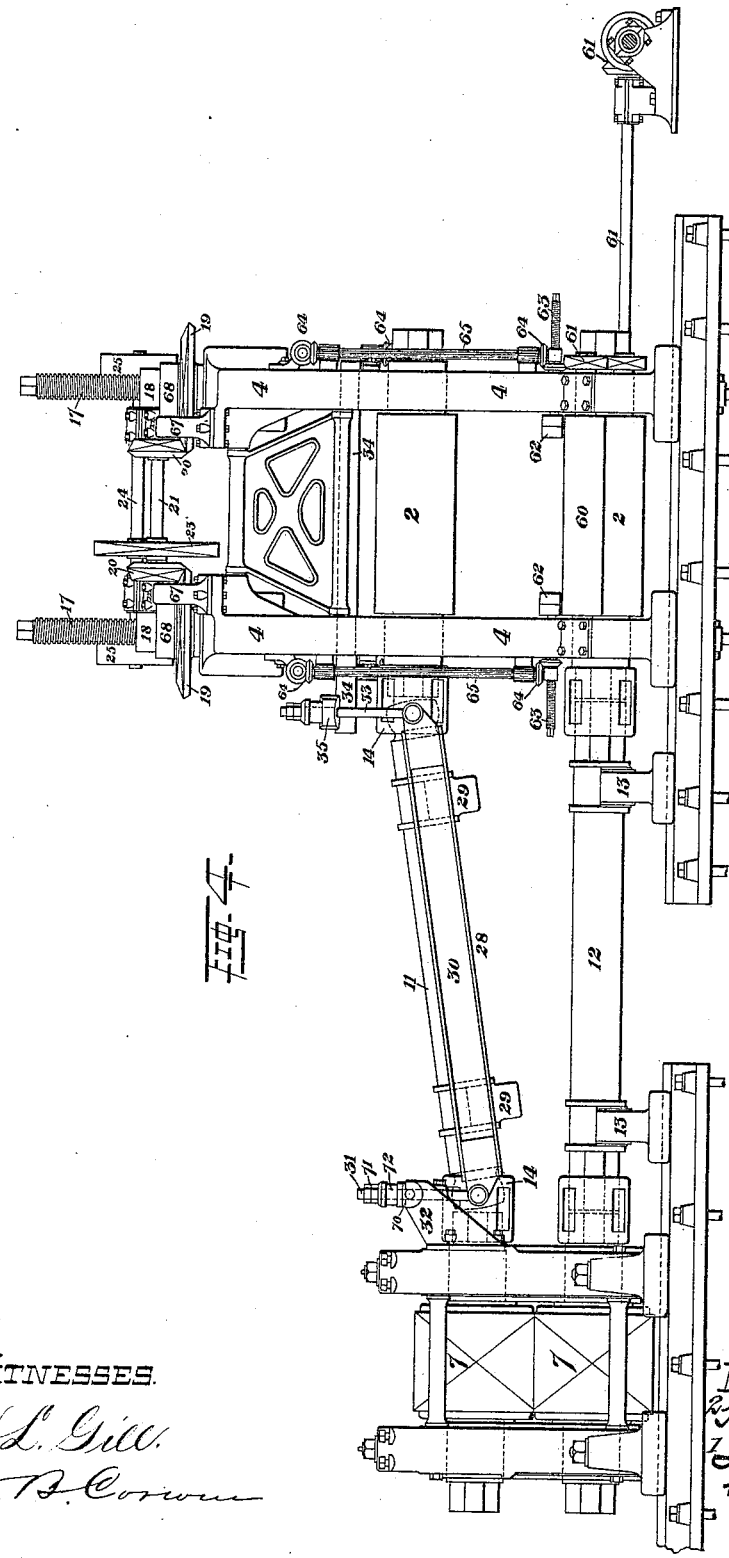

(No Model.) 9 Sheets—Sheet 5.

J. KENNEDY & H. AIKEN.
UNIVERSAL ROLLING MILL.

No. 403,273. Patented May 14, 1889.

WITNESSES.
H. L. Gill.
W. B. Corwin

INVENTORS
2 Henry Aiken
1 Julian Kennedy
by W. Bakewell & Sons
their Attorneys

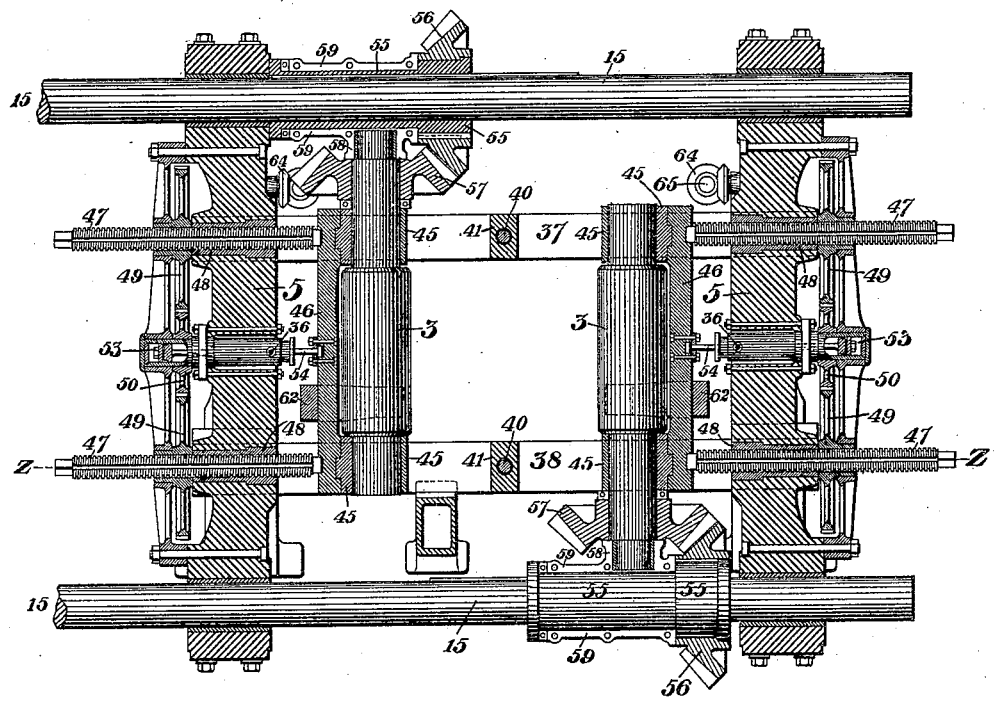

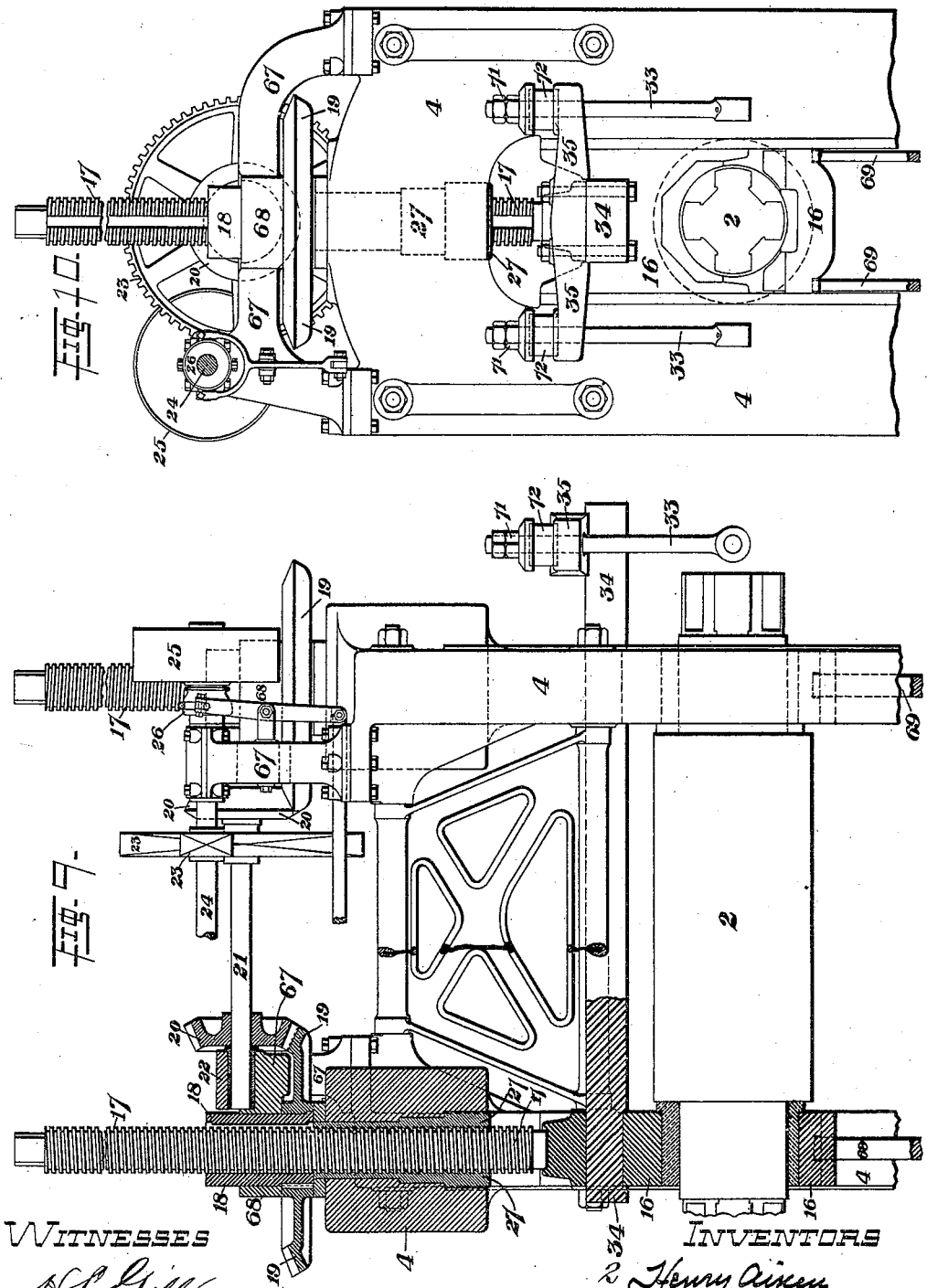

(No Model.) 9 Sheets—Sheet 8.
J. KENNEDY & H. AIKEN.
UNIVERSAL ROLLING MILL.
No. 403,273. Patented May 14, 1889.
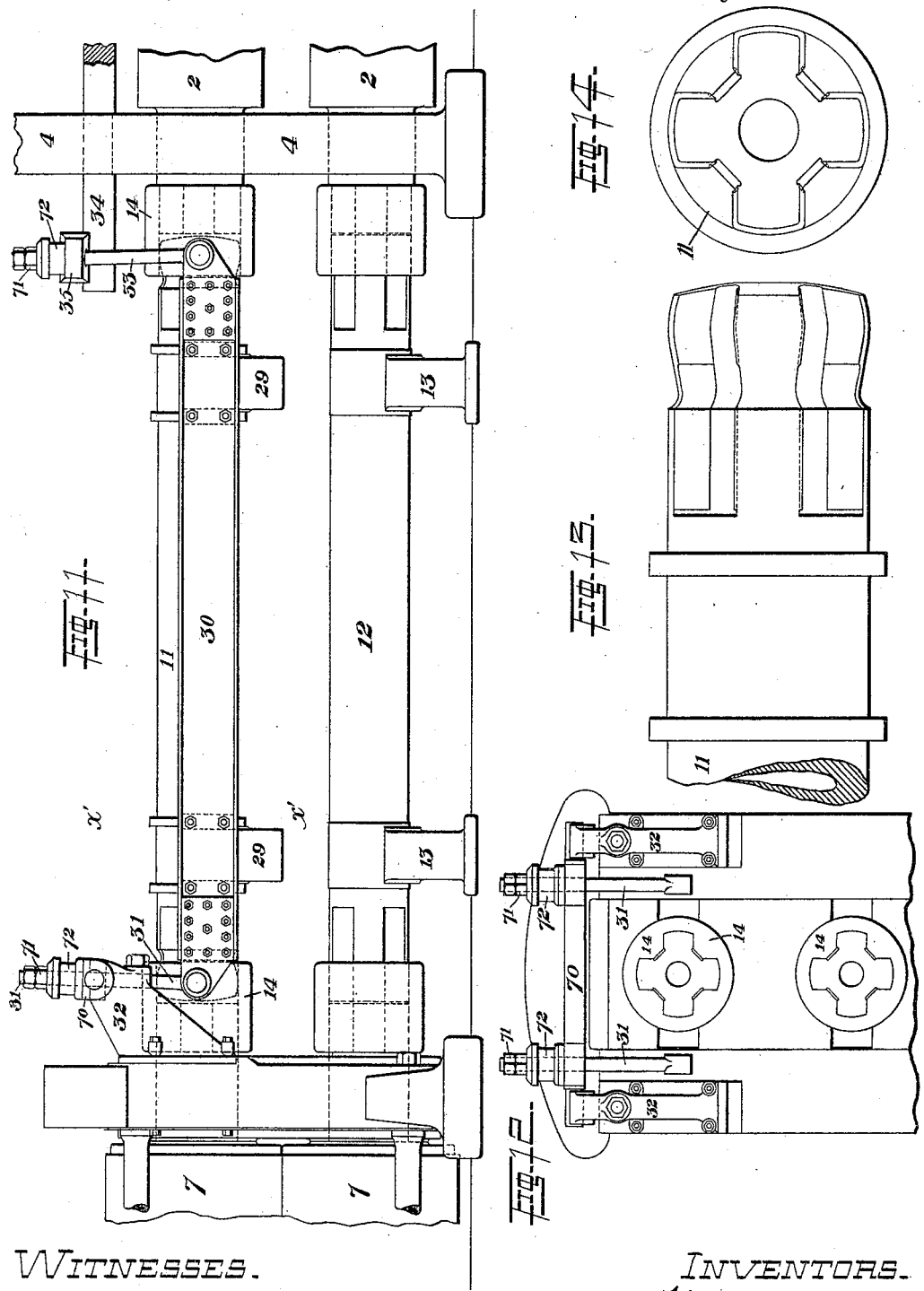
WITNESSES. INVENTORS.

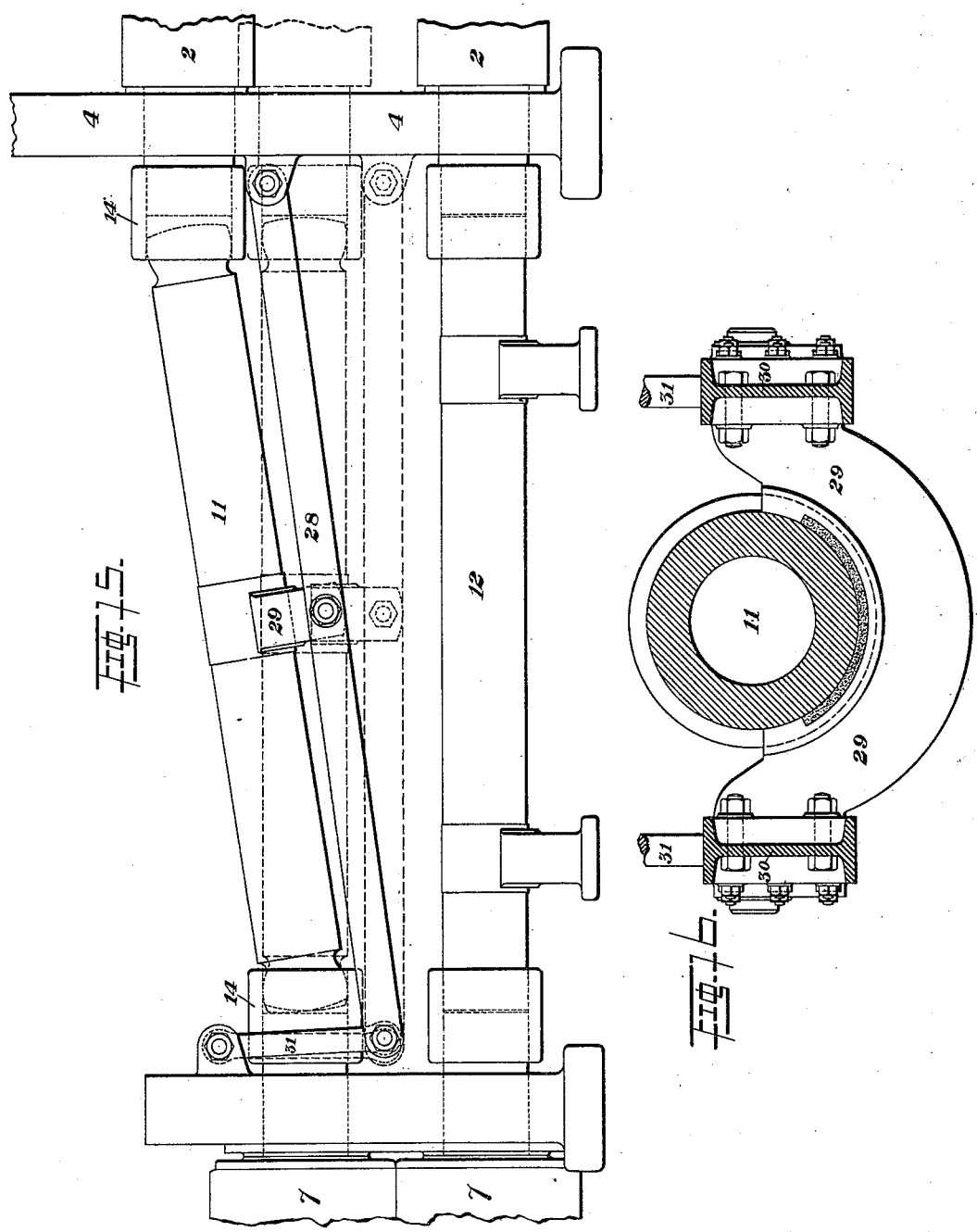

UNITED STATES PATENT OFFICE.

JULIAN KENNEDY AND HENRY AIKEN, OF HOMESTEAD, PENNSYLVANIA.

UNIVERSAL ROLLING-MILL.

SPECIFICATION forming part of Letters Patent No. 403,273, dated May 14, 1889.

Application filed March 16, 1888. Serial No. 267,406. (No model.)

*To all whom it may concern:*

Be it known that we, JULIAN KENNEDY and HENRY AIKEN, of Homestead, in the county of Allegheny and State of Pennsylvania, have invented a new and useful Improvement in Universal Mills; and we do hereby declare the following to be a full, clear, and exact description thereof, reference being had to the accompanying drawings, forming part of this specification, in which—

Figure 2:
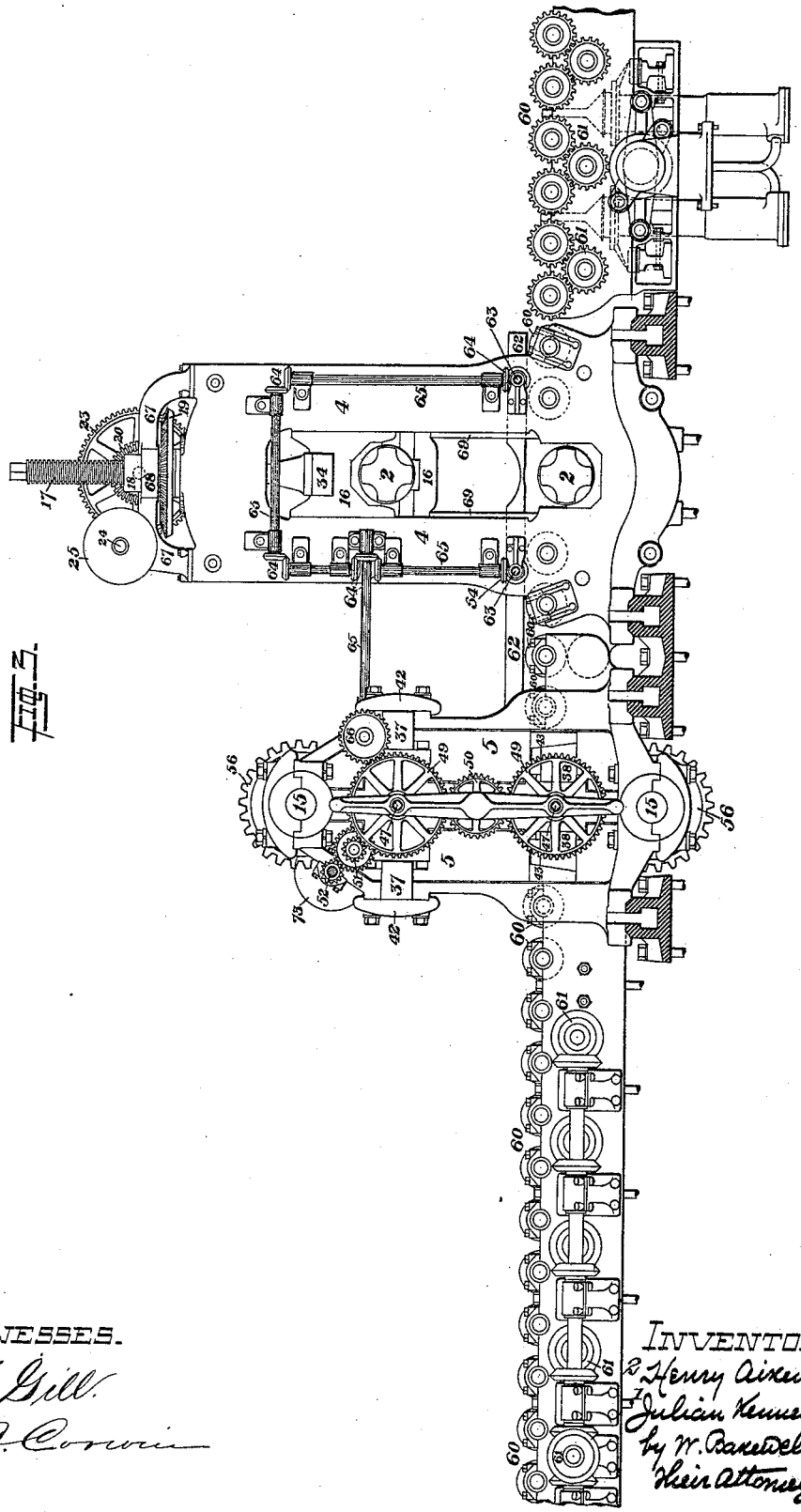
Figure 5:
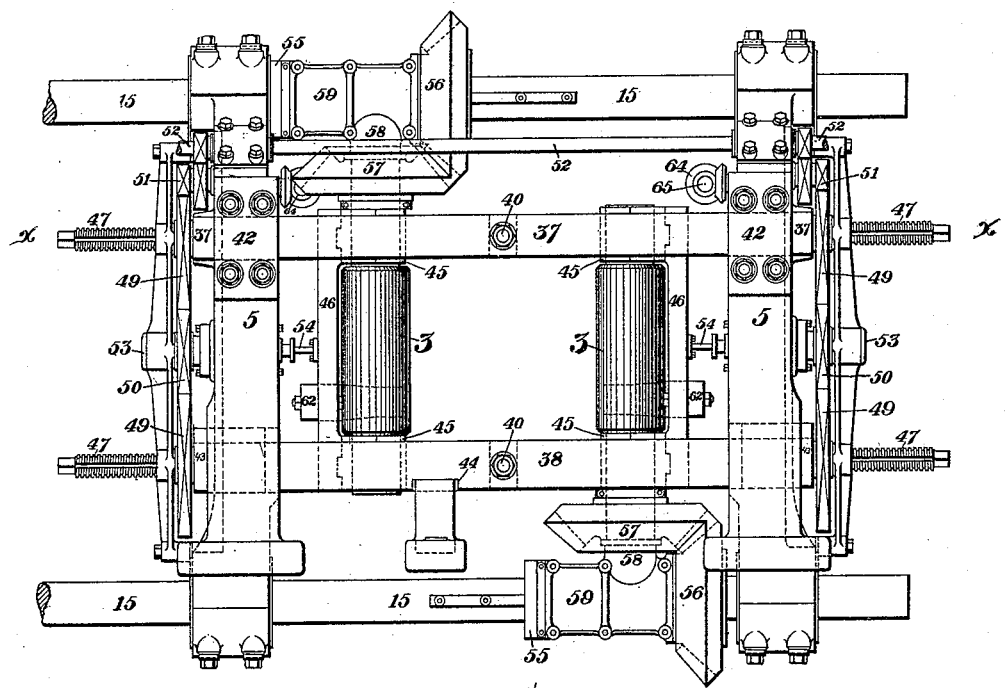
Figure 6:
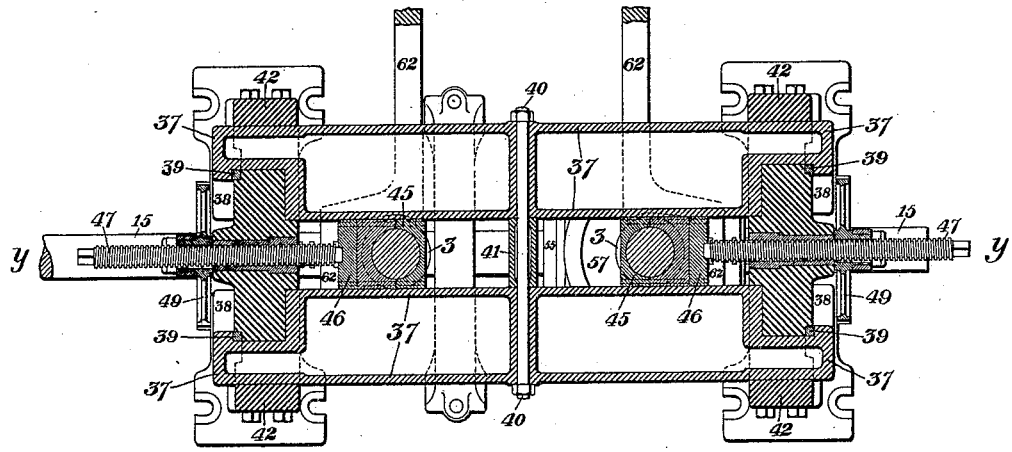

Figure 1 is a general plan view of the mill, showing the engines by which the rolls are driven. Fig. 2 is an enlarged plan view of the rolls and their connections. Fig. 3 is a side elevation of the vertical and horizontal rolls of the mill and the feed-tables. Fig. 4 is a front elevation of the horizontal rolls and their gearing. Fig. 5 is a front elevation of the vertical rolls. Fig. 6 is a horizontal section on the line $x\ x$ of Fig. 5. Fig. 7 is a vertical longitudinal section on the line $y\ y$ of Fig. 6. Fig. 8 is a horizontal section on the line $z\ z$ of Fig. 7. Fig. 9 is an enlarged front view of the housing of the upper of the horizontal rolls, one side being shown in section, showing, also, the hangers for supporting the cradle of the spindle. Fig. 10 is a side view thereof. Fig. 11 is a front elevation of the spindles of the horizontal rolls, showing particularly the cradle whereby the spindle of the upper roll is suspended. Fig. 12 is a side view of the housing of the pinions. Fig. 13 is an enlarged side view of the end of the upper spindle of the horizontal rolls. Fig. 14 is an end view thereof. Fig. 15 is a side view of one of the old forms of spindle in use prior to my invention. Fig. 16 is an enlarged vertical cross-section on the line $x'\ x'$ of Fig. 11.

Like symbols of reference indicate like parts in each.

In rolling iron in universal mills employing a set of horizontal rolls and one or more sets of vertical rolls, all driven by the same engine, it is found that where both the horizontal and vertical rolls are driven at the same rate of speed the greater rapidity with which the metal emerges from the horizontal rolls as compared with the speed with which it enters them causes the metal to slip between the vertical rolls. This is a serious disadvantage because of the great wear which it causes on the surface of the rolls, and it is not possible to prevent it entirely by arranging the gearing of the vertical rolls so that they shall be driven more rapidly than the horizontal rolls because of the unequal elongation of the metal at different periods of the rolling process. In order, therefore, as far as possible to prevent the wear on the vertical rolls, it has been the practice to provide these rolls with crabs, so that on an excess of pressure being applied to them by the elongating metal the rolls shall yield thereto and shall rotate at a higher speed than their driving-gear. This, however, is a construction which possesses features of disadvantage because of its expense and complication, and where the mill is a reversing-mill it necessitates the use of two sets of vertical rolls—one on each side of the horizontal rolls.

In order to dispense with the necessity of appliances such as we have described and to enable the mill to be used with only one set of vertical rolls, we employ two separate driving-engines—one for each pair of rolls. The result is that each pair of rolls being entirely independent of the other can be driven at the proper rate of speed, and when, owing to unequal elongation of the metal, it is fed to the rolls in advance faster than they can take it in when revolving at their normal rate of speed the effect is only to assist the rotation of these rolls and their engine and to cause them to operate at a sufficiently higher rate of speed to compensate for the unequal feed. In this way both sets of rolls are always caused to work on the metal with a positive force, slipping of the metal is prevented, and the effective power of the mill is greatly increased without any complication or undue expense in the machinery.

We shall first describe that part of the mill which relates to this feature of our invention and shall then describe the remainder, indicating in the course of the description the several points of invention and their advantages.

In the drawings, (see Figs. 1, 2, 3, and 4,) 2 2 are the horizontal rolls, and 3 3 are the vertical rolls. The horizontal rolls are mounted in suitable housings, 4, and the vertical rolls are mounted in a frame or housing, 5, the particular arrangement of which we shall hereinafter indicate.

6 is the engine which drives the horizontal rolls and which is connected with the usual pinions, 7, by a rotary shaft, 8.

9 is the engine for the vertical rolls, and 10 are the pinions with which it is connected.

The horizontal rolls 2 are connected with the pinions 7 by spindles 11 and 12, the lower spindle, 12, being arranged in stationary bearings 13, while the upper spindle is at the ends connected with the neck of its pinion and the neck of the upper roll by coupling-boxes 14, so as to permit of vertical adjustment of the roll, as will be readily understood. So, also, the power shafts 15 of the vertical rolls are connected with and driven by the pinions 10. Instead, therefore, of the rolls being driven from the same engine their driving-gearings are quite independent of each other.

Both engines 6 and 9 are reversing engines, so that the metal which is being rolled may be passed back and forth between the rolls, and because of the use of the separate engines it is immaterial whether the metal first passes between the vertical or horizontal rolls.

We shall now describe the arrangement of the horizontal rolls. The lower of these rolls is journaled in fixed or non-adjustable bearings in the housings 4, and the upper roll is journaled in adjustable bearings 16, and is adjusted by screws 17—one a right-hand and the other a left-hand screw—which screws extend up above the housings. Around each screw 17, above the housing, is an elongated sleeve or bush, 18, attached to the screw by feather and spline, and around this bush is fitted and keyed a bevel gear-wheel, 19, which meshes with a second bevel-gear, 20, on a transverse shaft, 21. This shaft 21 is at the ends journaled in bearings 22 made in arches 67, which extend as caps across the housings, and have laterally-extending lugs 68, which fit around the bushes 18 on the screws, and at the base are in contact with and give bearing-surface to the hubs of the gear-wheels 19. The shaft 21 is by gear-wheels 23 geared with a shaft, 24, which is provided with driving-belt pulley-wheels 25 and the usual reversing clutches, 26, Fig. 9. The screws 17 are encircled by suitable threaded boxes or screw-nuts, 27, so that when the screws are turned by revolution of the shafts 24 and 21 the bearings of the rolls shall be forced down, as will be readily understood. The roll may be counterbalanced in any of the well-known ways; but as neither the counterbalancing nor the manner in which it is done forms part of our invention we have not illustrated it in the drawings further than to show in Figs. 9 and 10 the piston-rods 69 of hydraulic cylinders bearing against the under sides of the bearings of the roll. With regard to the arrangement of the horizontal rolls in their housings our invention consists in the use of a bar, 34, which extends across the housings of the rolls and rests upon the bearings 16 thereof. The bar 34 preferably rests in somewhat deep vertical recesses made in the surface of the bearings 16, as shown in Figs. 3, 9, and 10. This prevents lateral displacement of the bar, and in order to prevent its longitudinal displacement the under side of the bar is preferably provided with shallow jogs or recesses to fit on the bearings at the bases of the said vertical recesses. The adjusting-screws bear down upon the bar 34, and the pressure of the screws is transmitted to the bearings through the bar. The object of the latter is to distribute this pressure upon the bearings and by means of its extended surface to maintain the bearings in a substantially-horizontal position and prevent their canting. Without the use of the bar the upward strain on the rolls when the metal passes between them would be transmitted separately on each side of the upper roll directly from the bearings upon the ends of the screws, and when the strain is greater on one side than on the other, as if the metal should not pass through the middle of the rolls, the small bearing-surface afforded by the end of the adjusting-screw would permit the bearing to cant upon the neck of the roll and would produce friction and wear, which in time would seriously injure the roll. All this is prevented by using the bar, and a substantial bearing-seat is provided for the screws on the bearings of the rolls, which are kept in a substantially-horizontal position, and, while the bearings are bonded together by the bar, the fact that the bar is not rigidly connected with the bearings, but is loosely interposed between the bearings and screws, allows the bearings to slightly yield vertically to the positions of the rolls and the adjusting-screws. This feature is especially desirable in cases where the rolls are of very large size.

We shall now describe the manner in which the spindle 11 of the upper horizontal roll is supported by its cradle 28, Figs. 2, 4, 9, 10, 11, and 12. As before explained, the neck of the upper pinion, 7, and the end of the spindle are connected by the usual coupling-box, 14, and the end of the spindle and the neck of the upper roll, 2, are connected in like manner. In large mills the spindle 11 is necessarily heavy, and is therefore supported by a cradle or frame. The cradle which we show consists of a frame made of two side pieces or bars, 30, constituted, preferably, of I-bars and supporting or bridge pieces 29, which extend from one side bar of the frame to the other beneath the spindle, and which form the rest or support therefor, Fig. 16. These bridge-pieces 29 are two or more in number, arranged on each side of the center of the spindle. At the end of the spindle next the pinion-housing the cradle is supported by swinging links or rods 31, which are pivotally connected to the side pieces of the cradle at points opposite to the center of the pivotal motion of the spindle end or wabbler within the coupling-box in the act of adjustment, and which at their upper ends are connected with a cross-bar, 70, which rests on bearings on brackets 32, projecting from the pinion-housing, Figs. 11 and 12. The rods 31 are vertically adjustable by means of nuts 71, by means of which the cradle can be drawn up more tightly against the spindle to compensate for wear.

72 are rubber springs which give elasticity to the support. The other end of the cradle next to the horizontal rolls is supported by links 33, in like manner connected at their lower ends with the cradle opposite to the center of pivotal motion of the wabbler in the coupling-box, and at their upper ends connected with a frame, 35, which is supported by the cross-bar 34, which for this purpose is made to project beyond the housing, as shown in Figs. 9 and 10. The frame 35 therefore moves up and down with the bearings of the upper roll, 2, and the cradle 28 rises and falls with the motion of the spindle in the adjustment of the roll and supports it at the bridge-pieces 29 at every position which the spindle may assume. Fig. 15 illustrates the prior mode of suspending the cradle. The points of suspension, instead of being coincident with the center of motion of the spindle-wabbler, were at the housings of the pinions and the bearings of the roll back of the coupling-boxes. When the spindle was in a horizontal position, as shown in dotted lines, it was of course parallel with the cradle; but when the roll was raised so as to bring the spindle into an inclined position the parallelism of the spindle and cradle was destroyed, as clearly shown in Fig. 15. The only point at which the distance between the spindle and cradle was constant was at the middle, and it was at this point alone that the spindle could be supported by a bridge-piece, 29. With small spindles the single support thus afforded might be sufficient; but when the spindle is large if it is supported only at the middle it is not held with sufficient steadiness, and undue strain being thrown on the wabblers and coupling is very apt to wear these parts, together with the neck of the roll, to such a degree as soon to spoil them for use. As distinguished from this prior state of the art, our invention consists in supporting the cradle substantially at the center of pivotal motion of the wabblers in the act of adjustment. When thus supported, no matter in what position the cradle may be, it is always parallel with the spindle. The latter can therefore be supported on both sides of the center, with the result of giving to the spindle a steady and regular bearing, removing the strain from the coupling-boxes, and thus very greatly prolonging the effective life of the parts.

We shall now describe the arrangement of the vertical rolls 3, referring especially to the figures on the third, fifth, and sixth sheets of the drawings.

5 are the vertical housings between which the vertical rolls are mounted. These housings are connected by two pairs of horizontal rest-bars or frames, 37 and 38, which extend from one housing to the other, joining them together and at the same time forming a guide for the carriers of the rolls during their lateral adjustment. The construction of the upper pair of rest-bars or frames, 37, is shown in Fig. 6, and that of the lower pair, 38, is shown in Fig. 8. The ends of the rest-bars 37 are made with offsets, as shown in Fig. 6, and the housings are recessed, as shown in that figure, so as to afford a seat by which the rest-bar is upheld when the offset ends are fitted around the housings in said recesses. The upper rest-bars, 37, are held from lateral displacement by caps 42, which are bolted to the sides of the housings over the sides of the rest-bars at the ends thereof, and the rest-bars are tightened by means of wedges 39, which are inserted in suitable recesses between the housing and the inner side of the offset portion of the rest-bar, as shown in Fig. 6. Both the upper and lower rest-bars are preferably made of hollow castings, the adjacent rest-bars being held together and braced by cross-bolts 40 and interposed hollow sleeves or separators 41, through which the bolts pass. The rest-bars 38, which extend between the housings below the rest-bars 37, are similarly constructed, except that instead of the caps 42 they are secured in place by wedges 43 and 44.

As shown in Fig. 8, the housings at the ends of the rest-bars 38 are provided with openings or windows, in which the rest-bars are secured by the wedges. This is an important feature of our invention, because it enables us, by removing the wedges and keys and the gear-wheel 49, to draw out the rest-bars lengthwise without removing the rollers of the feed-table, as would be the case were the rest-bars designed to be removable sidewise. (See Fig. 3.) The spaces between the rest-bars form guideways for the bearings 45 of the vertical rolls, which are arranged in these spaces and are connected by vertical carriers 46. The adjusting-screws 47, by which the vertical rolls are moved toward each other, pass horizontally through the housings and engage the carriers 46 at points between the rest-bars. As shown in Fig. 7, these screws are caused to move lengthwise by means of internally-threaded boxes or nuts 48, which encircle the screws, and the screws are rotated by gear-wheels 49, connected with the screws by feathers and splines. The gear-wheels of the screws at the same side of the housings are connected by an intermediate gear, 50, and all are driven by a pinion, 51, which connects the upper gear-wheel, 49, with a driven shaft, 52. When the shaft 52 is rotated in the proper direction by means of the belt-pulley wheels 73, the intermediate gearing will drive the screws and will cause them to move the carriers 46 and the rolls toward each other, as will be readily understood.

In order to separate the rolls, we employ hydraulic cylinders 53, which are supported by the housings 5, Figs. 5 and 7, and whose pistons 54 extend up to and are connected with the carriers 46 of the vertical rolls. The water-supply pipes 36 of the hydraulic cylinders enter them in advance of the pistons, so that there is a continual force exerted on the pistons, tending to draw back the carriers of the rolls and to separate them from each other. This force acts against the forward pressure of the screws 47, and in operating to cause the approach of the rolls 3 the screws act against the backward pull of the hydraulic cylinders. In retracting the rolls the screws are simply drawn back by the reverse motion of their pinions and allow the hydraulic cylinders to do the actual work of retraction. The purpose of this arrangement is to keep the carriers continually bearing against the ends of the screws, and thus to prevent the loose motion and jar which would occur if the screws were relied on to do the work both of retracting and advancing the rolls. This is a very important feature of our invention, because it makes the operation of adjusting the rolls easy and positive, and, by removing a fruitful source of jarring and injury to the rolls and their housings, materially prolongs the effective life of these parts.

We shall now describe the manner in which the vertical rolls are driven, so that their adjustment to and from each other does not disengage their gearing.

Referring particularly to Figs. 5 and 7, we shall first describe the arrangement of the rolls 3 shown at the left side of these figures. The upper power-shaft, 15, by which the roll is driven, has encircling it a sleeve, 55, which is connected with the shaft by a feather and spline, so as to be movable lengthwise thereon. At the end of the sleeve 55, and keyed thereon, is a beveled gear-wheel, 56, which meshes with a corresponding gear-wheel, 57, set on the neck of the vertical roll. The upper end of the vertical roll is journaled in a tubular box or bearing, 58, which is a downwardly-projecting part of a collar, 59, fitting loosely around the sleeve 55. In order that it may be set in place, the collar 59 and the tubular-bearing 58, which forms part of the collar, are made in two longitudinally-divided parts connected by bolts. The right-hand vertical roll, 3, is arranged in the same manner as I have just described, the power-connections being with the lower driving-shaft, 15. With this arrangement it will be observed that as the rolls are moved to and from each other by the screws 47 the sleeves 55 will move correspondingly on the shafts 15, and the bearings 58 of course move with the sleeves and with the rolls, so that the cogs 56 and 57 are always in gear. This construction of parts is very compact and strong. The side-thrust of the gear-wheels is taken up with a minimum of friction, and a perfect movable bearing is afforded for the ends of the rolls. As distinguished from the prior state of the art, we are the first to journal the end of the vertical roll in a cylindrical bearing which moves with the pinion on the power-shaft, and also the first to connect the two beveled gear-wheels of the vertical rolls by a collar which encircles the sleeve of one of the gear-wheels. We also intend to claim, specifically, the construction of the collar in two parts bolted together. Besides this, the remaining feature of our invention, so far as concerns the arrangement of the vertical rolls and their housings, consists in the peculiar construction of the frames or rest-bars, which serve both as guides for the bearings of the rolls in their lateral adjustment and also serve to connect and brace the housings, making them very strong and compact, and affording the best possible means for resisting the enormous side-thrust of the rolls when the metal is passing between them. Heretofore these rest-bars have been simply interposed between the housings, and the housings connected by separate tie-bolts. This construction is at best defective, and in large mills necessitates the use of such large bolts or such a number of them as to make the housings of undue weight and to render the parts very difficult to tie tightly together. By constructing the rest-bars so that they shall pass around the housing and engage the outer as well as the inner side they are caused to perform a double function and very greatly increase the strength of the housings without unduly increasing their weight or bulk.

We shall now describe the construction and operation of the guides which direct the course of the bloom or ingot in its passage from one set of rolls to the other. The mill is provided with the usual feed-rollers, 60, which are journaled in suitable bearings in a manner well understood by those skilled in the art, and are driven by a reversing-engine, 74, through intermediate shafting and gearing, 61, Figs. 1, 2, 3, and 4. Extending from the vertical to the horizontal rolls and for a short distance past the horizontal rolls are guide-bars 62, arranged above and at right angles to the feed-rollers, the function of which is to guide the bloom or ingot and to prevent it from becoming canted on the feed-rollers in its passage from one set of rolls to the other. In order to make the guiding action of these bars as exact as possible, we propose to make them movable with the vertical rolls in their adjustment to and from each other, and to this end we connect the extremities of the guide-bars to the carriers 46 of the vertical rolls, Figs. 5 and 6, and where the guides pass between the housing of the horizontal rolls we provide them with adjusting-screws 63, Figs. 2, 3, and 4, which are driven by pinions 64, deriving their power from shafts 65, which are in turn driven by pinions 66, in gear with the cog-wheels 49, by which the adjusting-screws 47 of the vertical rolls are actuated. These screws 63 advance and retract the guide-bars 62 in a manner which will be readily understood, and as they are driven primarily by the same gearing which adjusts the vertical rolls the lateral motion of the guides to and from each other is simultaneous with the adjustment of the rolls and of exactly equal extent.

As distinguished from the prior state of the art, our invention consists in the use of guide-bars which are adjustable laterally by means of gearing driven simultaneously with the adjusting-gearing of the vertical rolls; also in the use of guide-bars extending not only from the vertical rolls to the horizontal rolls, but also between the horizontal rolls, so that the metal shall be guided thereby as it enters the horizontal rolls. Great accuracy in the action of the rolls is thus obtained.

We claim—

1. In a universal mill, the combination of the vertical and horizontal rolls and separate reversible engines by which they are driven independently, substantially as and for the purposes described.

2. The combination of horizontal rolls, one of which is mounted in vertically-adjustable bearings, a spindle connected therewith by a coupling-box, and a cradle supporting the spindle, said cradle being suspended by connections attached at substantially the centers of pivotal motion of the spindle ends in the coupling-boxes, substantially as and for the purposes described.

3. The combination, with the rest-bars which carry the vertical rolls, of the housings between which the rest-bars are mounted, each of the said housings having a window at the end of one of the lower rest-bars, through which the rest-bar may be inserted and withdrawn longitudinally, and fastening devices, substantially as described, by which the rest-bar is secured to the housing, substantially as and for the purposes described.

4. In a universal mill, the combination of the rest-bars which carry the vertical rolls, the housings between which the rest-bars are mounted, the said housings having openings or windows in which the lower rest-bars are fastened and through which they may be withdrawn longitudinally, and wedges for securing the rest-bars in said housings, substantially as and for the purposes described.

5. The combination, with the vertical roll, its carrier, and the screw mechanism by which the carrier is adjusted, of a hydraulic cylinder and its piston, which exert force on the carrier against the force of the screw mechanism, substantially as and for the purposes described.

6. The combination, with the laterally-adjustable vertical roll and the driving-shaft, of a movable pinion on said shaft connected with a pinion on the roll, and a cylindrical bearing encircling the end of the roll, which projects on the outer side of the pinion and movable with the pinion on the shaft, substantially as and for the purposes described.

7. The combination, with the laterally-adjustable vertical roll and its driving-shaft, of a pinion having a sleeve encircling the shaft and movable lengthwise thereon, and a collar loosely encircling the sleeve and having a tubular bearing which encircles the end of the vertical roll which projects on the outer side of its pinion, substantially as and for the purposes described.

8. In a universal mill, the combination, with the vertical and horizontal rolls, of guides extending from the vertical rolls between the horizontal rolls, substantially as and for the purposes described.

9. In a universal mill, the combination, with the horizontal rolls and laterally-adjustable vertical rolls, of guides extending from the vertical to the horizontal rolls, and screws which move the guides laterally, said screws being geared to move simultaneously with the adjusting-screws of the vertical rolls, substantially as and for the purposes described.

10. The combination, with the horizontal roll and its adjusting-screws, housings, and bearings, of a bar which extends across the housings and is interposed between the screws and the said bearings, said bar being made separate from the bearings, though held against the same by the pressure of the adjusting-screws, substantially as and for the purposes described.

11. The combination of horizontal rolls, a spindle, a carrier for the spindle, and a bar extending across the housings of the rolls and resting on the bearings thereof, said carrier being suspended from the said bar, substantially as and for the purposes described.

12. The combination, with the vertical rolls and their housings, of rest-bars for the rolls, which rest-bars extend between the housings and are notched or offset at the ends and provided with shoulders which bear against the inner and outer sides of the housings, bracing the same in both directions, substantially as set forth.

13. The combination of horizontal rolls, one of which is mounted in vertically-adjustable bearings, a spindle connecting the adjustable roll with its driving-shaft, and a cradle having separate bridge-pieces or supports 29, which support the spindle on both sides of the middle of its length, substantially as and for the purposes described.

In testimony whereof we have hereunto set our hands this 7th day of March, A. D. 1888.

JULIAN KENNEDY.
HENRY AIKEN.

Witnesses:
W. H. CORBETT,
H. L. KIRKWOOD.